United States Patent
Shi et al.

(10) Patent No.: US 9,870,768 B2
(45) Date of Patent: Jan. 16, 2018

(54) SUBJECT ESTIMATION SYSTEM FOR ESTIMATING SUBJECT OF DIALOG

(71) Applicant: Panasonic Intellectual Property Management Co., Ltd., Osaka (JP)

(72) Inventors: Hongjie Shi, Tokyo (JP); Takashi Ushio, Osaka (JP); Mitsuru Endo, Osaka (JP); Katsuyoshi Yamagami, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/262,785

(22) Filed: Sep. 12, 2016

(65) Prior Publication Data

US 2017/0084269 A1 Mar. 23, 2017

Related U.S. Application Data

(60) Provisional application No. 62/219,904, filed on Sep. 17, 2015.

(30) Foreign Application Priority Data

Apr. 13, 2016 (JP) ................. 2016-080684

(51) Int. Cl.
| | |
|---|---|
| *G10L 15/16* | (2006.01) |
| *G10L 15/06* | (2013.01) |
| *G06F 17/27* | (2006.01) |
| *G06N 3/04* | (2006.01) |

(52) U.S. Cl.
CPC .......... *G10L 15/16* (2013.01); *G06F 17/2785* (2013.01); *G06N 3/0454* (2013.01); *G10L 15/063* (2013.01); *G10L 2015/0635* (2013.01)

(58) Field of Classification Search
CPC ..................................................... G06F 17/279
See application file for complete search history.

(56) References Cited

U.S. PATENT DOCUMENTS

2003/0174881 A1    9/2003 Simard et al.

OTHER PUBLICATIONS

Qin, Pengda, Weiran Xu, and Jun Guo. "An empirical convolutional neural network approach for semantic relation classification." Neurocomputing 190 (2016): 1-9.*

(Continued)

*Primary Examiner* — Matthew Baker
(74) *Attorney, Agent, or Firm* — Greenblum & Bernstein, P.L.C.

(57) ABSTRACT

A subject estimation system includes a convolutional neural network to estimate a subject label of a dialog. The convolution neural network includes: one or more topic-dependent convolutional layers and one topic-independent convolutional layer, each of the one or more topic-dependent convolutional layers performing, on an input of a word-string vector sequence corresponding to dialog text transcribed from a dialog, a convolution operation dependent on a topic, and the topic-independent convolutional layer performing, on the input of the word-string vector sequence, a convolution operation not dependent on the topic; a pooling layer performing pooling process on outputs of the convolutional layer; and a fully connected layer performing full connection process on outputs of the pooling layer.

12 Claims, 12 Drawing Sheets

(56) References Cited

OTHER PUBLICATIONS

Er, Meng Joo, et al. "Attention pooling-based convolutional neural network for sentence modelling." Information Sciences 373 (2016): 388-403.*
Yoon Kim, "Convolutional Neural Networks for Sentence Classification", Proceedings of the 2014 Conference on EMNLP, pp. 1746-1751, Oct. 2014 [seached on Mar. 29, 2016] URL:http://arxiv.org/abs/1408.5882.
The Extended European Search Report dated Mar. 7, 2017 for the related European Patent Application No. 16187517.4.
Ronan Collobert et al: "Natural Language Processing (almost) from Scratch", Journal of Machine Learning Research, vol. 12, Aug. 1, 2011 (Aug. 1, 2011 ), pp. 2493-2537, XP055273931.

* cited by examiner

FIG. 9

| TOPIC | GENERAL MODEL | TOPIC-SPECIFIC MODEL | MULTI-TOPIC MODEL |
|---|---|---|---|
| Accommodation (42/30) | 0.87 | 0.92 | 0.95 |
| Attraction (2/4) | 0.00 | 0.00 | 0.00 |
| Food (42/30) | 0.82 | 0.90 | 0.91 |
| Shopping (8/8) | 0.49 | 0.37 | 0.51 |
| Transportation (1/10) | N/A | N/A | N/A |
| OVERALL | 0.76 | 0.80 | 0.80 |

SUBJECT ESTIMATION SYSTEM FOR ESTIMATING SUBJECT OF DIALOG

BACKGROUND

1. Technical Field

The present disclosure relates to a subject estimation system, a subject estimation method, and a non-transitory recording medium having a computer program stored thereon, the system, method, and program estimating a subject of a dialog.

2. Description of the Related Art

There are systems that perform pattern recognition by utilizing a convolutional neural network (for example, U.S. Patent Application Publication No. 2003/0174881 (hereinafter referred to as "Patent Document 1")). Patent Document 1 disclose a typical method for pattern recognition using a convolutional neural network.

Methods in which a convolutional neural network is applied to the field of natural-language processing have also been known (e.g., Yoon Kim, "Convolutional Neural Networks for Sentence Classification", searched on the Internet, URL:http://arxiv.org/abs/1408.5882, on Mar. 29, 2016 (this document is hereinafter referred to as "Non-Patent Document 1")). Non-Patent Document 1 discloses a method for classifying a sentence by using a convolutional neural network made to perform learning using a known data set.

However, the sentence classification methods using the above-described related art are based on the premise that the convolutional neural network is learned using a sufficient amount of learning data, and much consideration has not been given to cases in which the amount of learning data is not sufficient.

Thus, even when the convolutional neural networks disclosed in the related art are used, there is a drawback in that a task for estimating a subject of a dialog cannot be accurately performed when the amount of learning data is not sufficient.

SUMMARY

One non-limiting and exemplary embodiment provides a subject estimation system, a subject estimation method, and a non-transitory recording medium having a computer program stored thereon, the system, method, and program making it possible to more accurately estimate a subject of a dialog even when the amount of learning data is not sufficient.

In one general aspect, the techniques disclosed here feature a subject estimation system for estimating a subject label of a dialog. The subject estimation system includes: a processor; and a memory having a computer program stored thereon. The computer program causes the processor to execute a convolution neural network. The convolution neural network includes: a convolutional layer including one or more topic-dependent convolutional layers and one topic-independent convolutional layer, each of the one or more topic-dependent convolutional layers performing, on an input of a word-string vector sequence corresponding to dialog text transcribed from a dialog, a convolution operation dependent on a topic, and the topic-independent convolutional layer performing, on the input of the word-string vector sequence, a convolution operation not dependent on the topic; a pooling layer that performs pooling processing on outputs of the convolutional layer; and a fully connected layer that performs full connection processing on outputs of the pooling layer.

It should be noted that general or specific embodiments may be implemented as a system, a method, an integrated circuit, a computer program, a storage medium, or any selective combination thereof.

According to the present disclosure, even when the amount of learning data is not sufficient, it is possible to realize a subject estimation system and so on that can more accurately estimate a subject of a dialog.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 9 is a table illustrating a result of experimental verification of the subject estimation system in the first embodiment;

DETAILED DESCRIPTION (Knowledge Underlying Present Disclosure)

Figure 1:
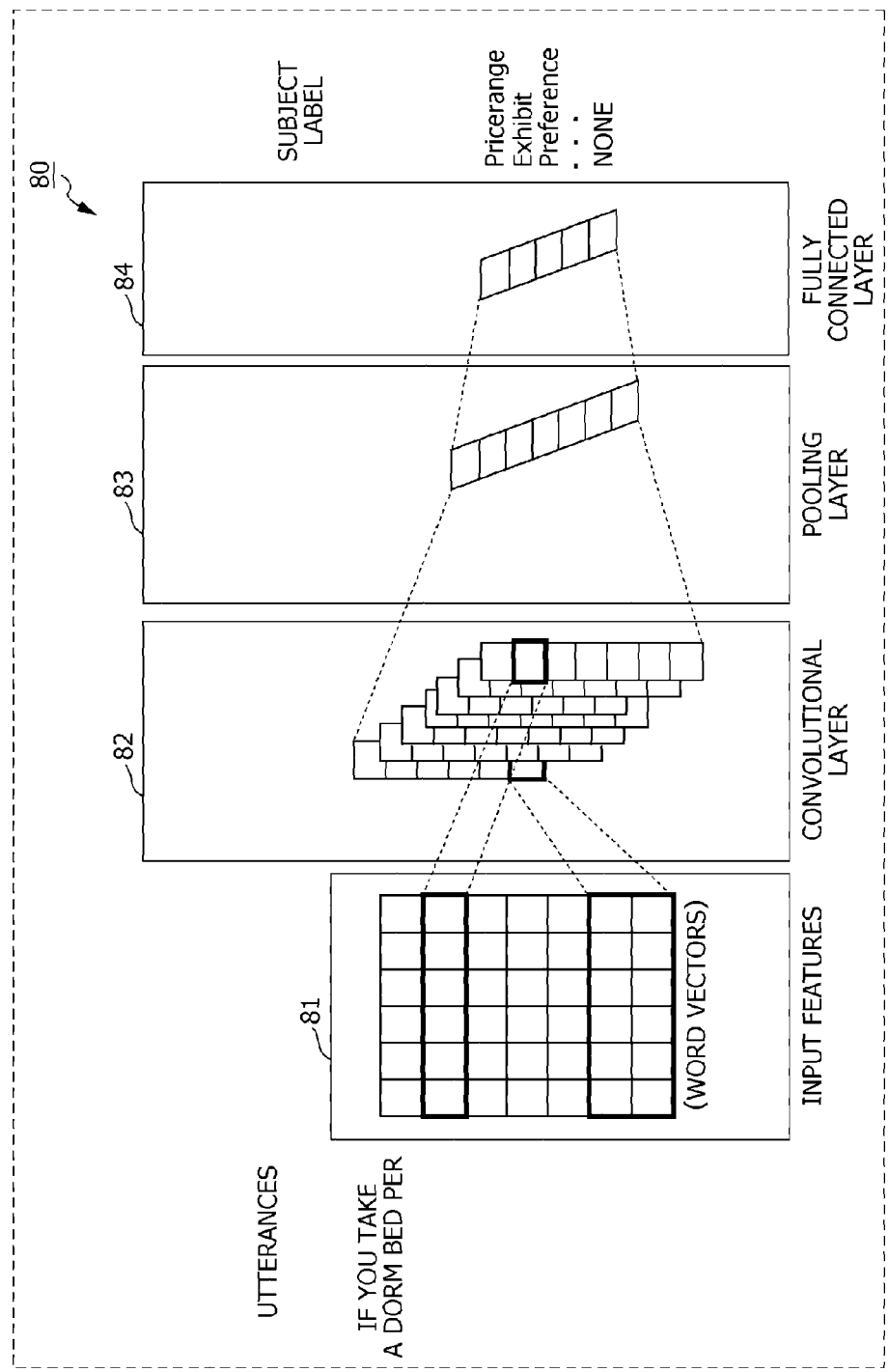
FIG. 1 is a diagram illustrating the architecture of a convolutional neural network utilized by a subject estimation system in a comparative example.

A dialog-subject estimation task envisaged in the present disclosure is a task for estimating what is the subject of a dialog, which is a natural language communication basically between two parties regardless of whether they are humans or machines. In the task, a word string in a dialog is input, and what is the subject in the dialog is estimated using, as one unit, a segment of the word string recognized as being relevant to one topic.

In a subject estimation system based on a convolutional neural network, learning of the convolutional neural network is performed using learning data, and evaluation thereof is performed using evaluation data.

In the above-described task envisaged in the present disclosure, a finite number of topics are defined, and a finite number of subjects desired to be obtained as outputs are also defined. Also, what is a topic is given to the subject estimation system in conjunction with a word string in a segment.

However, as described above, when the convolutional neural network disclosed in the related art is used for a subject estimation system, it is based on the premise that the convolutional neural network is made to perform learning using a sufficient amount of learning data. Cases in which the amount of learning data is sufficient have not been studied.

For example, when data obtained by transcribing a dialog between humans from recorded data of the dialog is utilized as learning data, cases in which the amount of dialog is small for a certain topic and thus the amount of learning data therefor is small can occur. Also, with respect to subjects desired to be obtained as outputs, cases in which the amount of learning data is small for a certain subject can also occur. Such cases in which the amount of learning data is small and also there is an imbalance in the numbers of pieces thereof have not been studied.

Thus, even when the convolutional neural network disclosed in the related art is used, there is a drawback in that a dialog subject estimation task cannot be accurately performed when the amount of learning data is not sufficient.

In order to overcome such a drawback, a subject estimation system according to one aspect of the present disclosure is directed to a subject estimation system for estimating a subject label of a dialog. The subject estimation system includes: a processor; and a memory having a computer program stored thereon, the computer program causes the processor to execute a convolution neural network. The convolution neural network includes: a convolutional layer including one or more topic-dependent convolutional layers and one topic-independent convolutional layer, each of the one or more topic-dependent convolutional layers performing, on an input of a word-string vector sequence corresponding to dialog text transcribed from a dialog, a convolution operation dependent on a topic, and the topic-independent convolutional layer performing, on the input of the word-string vector sequence, a convolution operation not dependent on the topic; a pooling layer that performs pooling processing on outputs of the convolutional layer; and a fully connected layer that performs full connection processing on outputs of the pooling layer.

With this configuration, even when the amount of learning data is not sufficient, it is possible to realize a subject estimation system that can more accurately estimate a subject of a dialog. More specifically, according to this configuration, one topic-independent convolutional layer that is learned for each topic and that has high accuracy when the amount of learning data is large and one or more topic-dependent convolutional layers that are learned independently of a topic and that have high accuracy when the amount of learning data is small are integrated together at the higher tiers, thus providing subject estimation performance that is high even when the amount of learning data is small.

Also, the convolutional neural network may estimate a subject label of the dialog with respect to the input by solving the input as a two-class classification problem.

Also, in the convolutional neural network, by using, as learning data, learning dialog text that is transcribed from a dialog and in which time-series text of the dialog is pre-divided into segments for respective topics and labels for the corresponding topics are pre-given to the respective divided segments, each of the one or more topic-dependent convolutional layers may be made to learn first weights so as to perform a corresponding convolution operation dependent on each topic on which the topic-dependent convolutional layer is dependent, and the topic-independent convolutional layer may be made to learn second weights so as to perform a convolution operation not dependent on the topic on which the topic-dependent convolutional layer is dependent.

Also, in response to an input of a word-string vector sequence that is included in word-string vector sequences corresponding to the learning dialog text and that is relevant to the topic on which the topic-dependent convolutional layer is dependent, each of the one or more topic-dependent convolutional layers may be made to learn the first weights so as to perform a convolution operation dependent on the topic on which the topic-dependent convolutional layer is dependent; and in response to an input of the word-string vector sequence corresponding to the learning dialog text, the topic-independent convolutional layer may be made to learn the second weights so as to perform a convolution operation not dependent on the topic on which the topic-dependent convolutional layer is dependent.

In order to overcome the above-described drawback, a subject estimation method according to one aspect of the present disclosure is directed to a computer-implemented method for estimating a subject label of a dialog. The method causes a processor to execute a convolution neural network. The convolution neural network includes: performing, on an input of a word-string vector sequence corresponding to dialog text transcribed from a dialog, topic-dependent convolution processing including a convolution operation dependent on a topic; performing, on the input, topic-independent convolution processing including a convolution operation not dependent on the topic; performing pooling processing on outputs of the topic-dependent convolution processing and outputs of the topic-independent convolution processing; and performing full connection processing on outputs of the pooling processing.

Thus, even when the amount of learning data is not sufficient, it is possible to realize a subject estimation method that can more accurately estimate a subject of a dialog. More specifically, since a result of the convolution operation dependent on a topic and a result of the convolution operation not dependent on the topic are integrated together at the subsequent stages, high subject-estimation performance can be obtained even when the amount of learning data is small.

Also, in the performing of the topic-dependent convolution processing, a convolution operation between the word-string vector sequence and first weights (A) triggered by a specific word indicating a topic on which the topic-dependent convolution processing is dependent may be performed. In the performing of the topic-independent convolution processing, a convolution operation between the word-string vector sequence and second weights triggered by a word indicating a topic other than the topic on which the topic-dependent convolution processing is dependent may be performed. In the performing of the pooling processing, a computational operation for extracting maximum values in a time direction from the outputs of the topic-dependent convolution processing and the outputs of the topic-independent convolution processing may be performed. In the performing of the full connection processing, after weighted addition using a connection weight is performed on the outputs of the pooling processing, a result of the weighted addition may be represented with a probability distribution to perform the full connection processing.

Also, the subject estimation method may further include estimating a subject label of the dialog by comparing the probability distribution of the outputs of the pooling processing with a threshold, and outputting the subject label.

Also, the subject estimation method may further include: inputting the word-string vector sequence corresponding to the dialog text. The dialog text may be text transcribed from a dialog in a time series, and the word-string vector sequence may be obtained by calculating vectors of words in a word string included in the dialog text by using a predetermined method.

The subject estimation method may further include: making the convolutional neural network learn the first weights so as to perform a convolution operation dependent on a topic on which the topic-dependent convolution processing is dependent, by using, as learning data, learning dialog text that is transcribed from a dialog and in which time-series text of the dialog is pre-divided into segments for respective topics and labels for the corresponding topics are pre-given to the respective divided segments; and making the convolutional neural network learn the second weights so as to perform, in the topic-independent convolution processing, a convolution operation not dependent on the topic on which the topic-dependent convolution processing is dependent, by using the learning dialog text.

Also, in the learning of the first weights, the convolutional neural network may be made to learn the first weights by using a word-string vector sequence that is included in word-string vector sequences corresponding to the learning dialog text and that is relevant to the topic on which the topic-dependent convolution processing is dependent; and in the learning of the second weights, the convolutional neural network may be made to learn the second weights by using a word-string vector sequence that is included in the word-string vector sequences corresponding to the learning dialog text and that is relevant to a topic other than the topic on which the topic-dependent convolution processing is dependent.

Also, when the number of word-string vector sequences that are included in the word-string vector sequences corresponding to the learning dialog text and that are relevant to a first topic on which the convolution operation is dependent is smaller than the number of word-string vector sequences that are included in the word-string vector sequences corresponding to the dialog text and that are relevant to a second topic on which the convolution operation is dependent, dialog text that is relevant to the first topic and is obtained through web searching may be used as semi-supervised data of the learning data to perform the learning of the first weights and the learning of the second weights.

Not only is the present disclosure realized as a device, but also the present disclosure can be realized as an integrated circuit having processing means included in such a device, can be realized as a method for implementing the processing means included in the device as processes, can be realized a program for causing a computer to execute the processes, and can be realized as information, data, or signals indicating the program. The program, information, data, and signals may be delivered via recording media, such as a compact disc read-only memory (CD-ROM), or communication media, such as the Internet.

Embodiments of the present disclosure will be described below in detail with reference to the accompanying drawings. The embodiments described below each represent a specific example in the present embodiment. Numerical values, shapes, constituent elements, steps, the order of steps, and so on described in the embodiments below are examples and are not intended to limit the present disclosure. Of the constituent elements in the embodiments described below, the constituent elements not set forth in the independent claims that represent the broadest concept will be described as optional constituent elements. In all of the embodiments, the details thereof can also be combined.

First Embodiment

In a first embodiment, a description will be given of a subject estimation system that has a convolutional neural network and that estimates a subject label of a dialog. The architecture and so on of a convolutional neural network utilized by a subject estimation system in a comparative example is first described below with reference to FIG. 1, and then the architecture and so on of a convolutional neural network utilized by a subject estimation system in the present embodiment is described with reference to FIG. 3.

[Architecture, Etc. of Subject Estimation System in Comparative Example]

FIG. 1 is a diagram illustrating the architecture of a convolutional neural network 80 utilized by the subject estimation system in the comparative example. The convolutional neural network 80 illustrated in FIG. 1 includes input features 81, a convolutional layer 82, a pooling layer 83, and a fully connected layer 84.

The input features 81 converts an input word string into a vector sequence by using a predetermined method. The convolutional layer 82 clips a vector sequence of one to several adjacent words and then performs a convolution operation by using a learned weighting matrix. With respect to outputs of the convolutional layer 82, the pooling layer 83 performs a computational operation for determining maximum values in a time direction. The fully connected layer 84 multiplies outputs of the pooling layer 83 for respective output elements of the fully connected layer 84 by a connection weight, adds up the resulting outputs, and lastly converts the result of the addition into a probability distribution by using a softmax function.

When such a convolutional neural network 80 in the comparative example is used for a subject estimation task, a weight on a portion that is included in a word string in a dialog and that is highly relevant to the subject thereof increases through learning using learning data, thus making it possible to estimate a specific subject when a specific linguistic expression is included.

Frames denoted by thick lines in the input features 81 in FIG. 1 are time windows. FIG. 1 illustrates two types of time window, that is, a time window for one word and a time window for two words. These time windows are shifted along the time direction from the beginning to the end of a vector sequence obtained by converting the input word string, and a convolution operation and nonlinear processing are performed for each time window to obtain output values. Output elements that hold these output values are represented by squares denoted by thick lines in the convolutional layer 82.

A convolution operation utilizing the convolutional neural network 80 is also referred to as "filter processing". The number of output elements in the convolutional layer 82 is determined by multiplication of the total number of filters by the number of shifts of the time windows. Also, the output elements in the fully connected layer 84 correspond to all subject labels, respectively, and thus the number of output elements in the fully connected layer 84 is determined by the number of all subject labels. Accordingly, in the subject estimation system utilizing the convolutional neural network 80 in the comparative example, a problem (subject estimation) is solved as a multi-class classification problem.

However, as described above, in the convolutional neural network 80 in the comparative example, when the amount of learning data is small, there is a drawback in that a task for estimating a subject in a dialogue cannot be performed with high accuracy, since it is affected by the estimation accuracy of a subject for which the amount of learning data is small is, and thus.

In addition, there is a drawback in that the convolutional neural network 80 in the comparative example does not support a multi-label output (ambiguity of a linguistic expression). This drawback will now be described with reference to FIG. 2.

Figure 2:
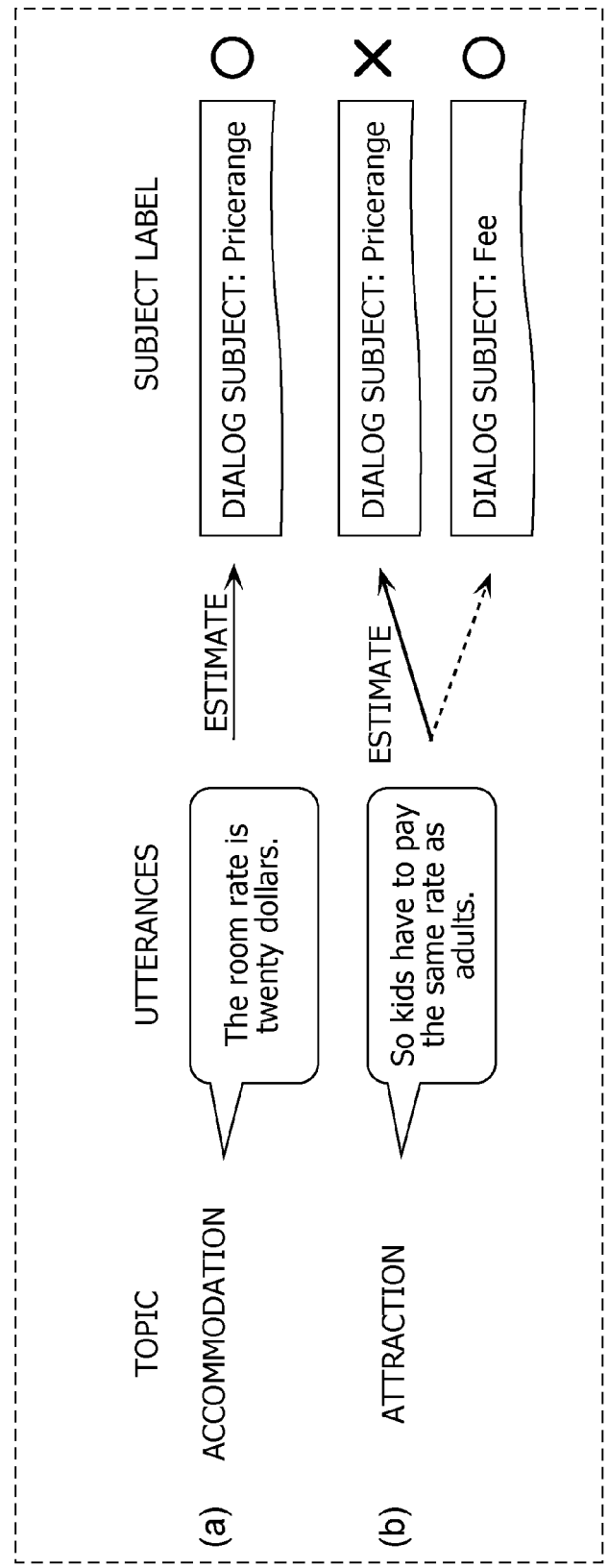
FIG. 2 is a diagram for explaining that the convolutional neural network in the comparative example does not support a multi-label output.

FIG. 2 is a diagram for explaining that the convolutional neural network 80 in the comparative example does not support a multi-label output.

FIGS. 2(a) and 2(b) illustrate a case in which the same word "rate" exists in word strings in dialogs, and the subject estimation system utilizing the convolutional neural network 80 estimates the subjects of dialog sentences having different topics. More specifically, FIG. 2(a) illustrates a subject label "pricerange" estimated by the subject estimation system utilizing the convolutional neural network 80 in the comparative example, when the topic is "accommodation", and the word string in the dialog is "The room rate is twenty dollars." FIG. 2(b) illustrates a subject label "pricerange" estimated by the subject estimation system utilizing the convolutional neural network 80 in the comparative example, when the topic is "attraction", and the word string in the dialog is "So kids have to pay the same rate as adults."

Although the same word "rate" exists in the word string in the dialog in FIG. 2(b), the topic thereof is different from the topic in FIG. 2(a), and thus a subject label "fee" is a correct solution. In FIG. 2(b), however, the subject label "pricerange" that is the same as that in FIG. 2(a) is estimated. Thus, there is also a drawback in that the subject estimation system utilizing the convolutional neural network 80 in the comparative example cannot support a case in which a subject varies depending on a context although the same word ("rate" in this example) exists in a word string in a dialog (i.e., when there is ambiguity in a linguistic expression).

[Architecture, Etc. of Subject Estimation System in Present Embodiment]

Figure 3:
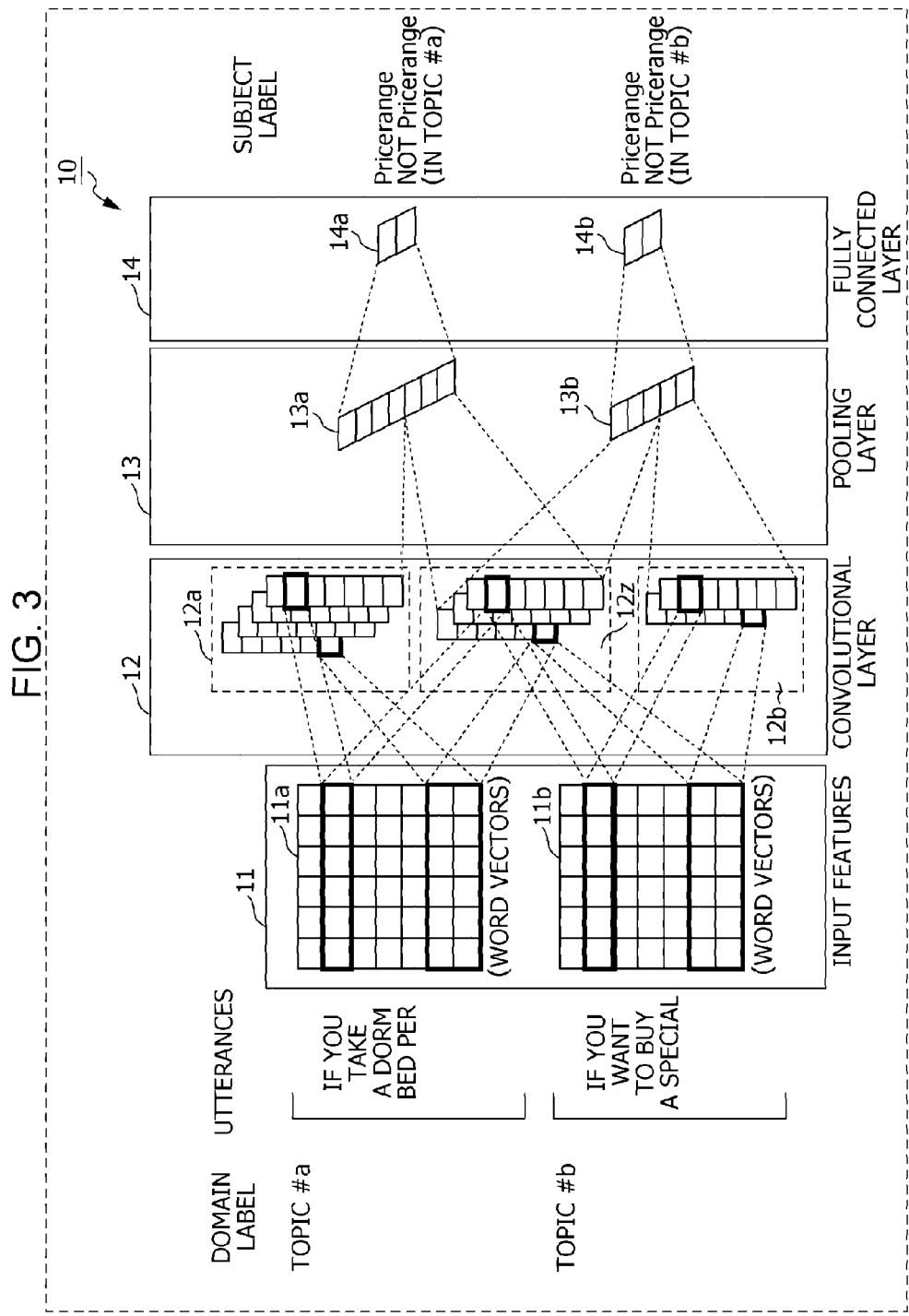
FIG. 3 is a diagram illustrating the architecture of a convolutional neural network utilized by a subject estimation system in a first embodiment.

FIG. 3 is a diagram illustrating the architecture of a convolutional neural network utilized by the subject estimation system in the present embodiment.

A convolutional neural network 10 illustrated in FIG. 3 includes input features 11, a convolutional layer 12, a pooling layer 13, and a fully connected layer 14. Although details are described below, depending on a topic, the input features 11 is connected to one of topic-dependent convolutional layers and to a topic-independent convolutional layer, the convolutional layers being included in the convolutional layer 12. Also, depending on the topic, the pooling layer 13 is connected to one of the topic-dependent convolutional layers and to the topic-independent convolutional layer. Additionally, the fully connected layer 14 is connected to the pooling layer 13, depending on the topic.

In response to an input word string, the input features 11 converts the input word string into a vector sequence by using a predetermined method. Vector sequences obtained by converting a word string by a predetermined method may be input to the input features 11. That is, a word-string vector sequence corresponding to dialog text transcribed from a dialog may be input to the input features 11. More specifically, a word-string vector sequence obtained (converted) by calculating vectors of words in a word string included in dialog text by using a predetermined method, the dialog text being text transcribed from a dialog in a time series, may be input to the input features 11.

The input features 11 is connected to one of the topic-dependent convolutional layers and to the topic-independent convolutional layer (described below), included in the convolutional layer 12, depending on the topic of a vector sequence of one to several adjustment words clipped using time windows, the vector sequence being included in the input vector sequence.

In the example illustrated in FIG. 3, a word-string vector sequence 11a corresponding to dialog text "if you take a dorm bed per . . . " transcribed from a dialog regarding topic #a is first input to the input features 11. Thereafter, a word-string vector sequence 11b corresponding to dialog text "if you want to buy a special . . . " transcribed from a dialog regarding topic #b is input to the input features 11. In this case, frames denoted by thick lines in the input features 11 in FIG. 3 are time windows. FIG. 3 illustrates two types of time window, that is, a time window for one word and a time window for two words, as in FIG. 1.

The convolutional layer 12 is constituted by one or more topic-dependent convolutional layers that each perform, on an input of a word-string vector sequence, a convolution operation dependent on a topic and one topic-independent convolutional layer that performs, on the input of the word-string vector sequence, a convolution operation not dependent on the topic. Each topic-dependent convolutional layer performs a convolution operation between the word-string vector sequence and first weights triggered by a specific word indicating the topic on which the topic-dependent convolutional layer is dependent. Each topic-independent convolutional layer also performs a convolution operation between the word-string vector sequence and second weights triggered by a word indicating a topic other than the topic on which the topic-dependent convolutional layer is dependent (i.e., a word indicating a topic not dependent on the topic on which the topic-dependent convolutional layer is dependent).

As described above, the convolutional layer 12 has topic-dependent convolutional layers associated with topics and a topic-independent convolutional layer that is not associated with the topics. The input features 11 is connected to one of the topic-dependent convolutional layers and to the topic-independent convolutional layer, depending on the topic.

In the present embodiment, a description will be given of an example in which there are two types of topic, that is, topic #a and topic #b. It goes without saying that the number of types of topic is not limited to two.

As illustrated in FIG. 3, the convolutional layer 12 is constituted by three parts, that is, a topic-dependent convolutional layer 12a that performs a convolution operation dependent on topic #a, a topic-dependent convolutional layer 12b that performs a convolution operation dependent on topic #b, and a topic-independent convolutional layer 12z that performs a convolution operation not dependent on these topics.

More specifically, the topic-dependent convolutional layer 12a performs a convolution operation between a vector sequence of one to several adjacent words, the vector sequence being clipped from the word-string vector sequence 11a, and a learned weighting matrix (the first weights) triggered by a specific word indicating topic #a. The topic-dependent convolutional layer 12b performs a convolution operation between a vector sequence of one to several adjacent words, the vector sequence being clipped from the word-string vector sequence 11b, and the learned weighting matrix (the first weights) triggered by a specific word indicating topic #b. The topic-independent convolutional layer 12z performs a convolution operation between the vector sequence of one to several adjacent words, the vector sequence being clipped from the word-string vector sequence 11a, and a learned weighting matrix (the second weights) triggered by a word indicating a topic other than topics #a and #b and a convolution operation between the vector sequence of one to several adjacent words, the vector sequence being clipped from the word-string vector sequence 11b, and the learned weighting matrix (the second weights).

The pooling layer 13 performs pooling processing on outputs of the convolutional layer 12. More specifically, the pooling layer 13 performs a computational operation for extracting maximum values in the time direction from outputs of the topic-dependent convolutional layers and outputs of the topic-independent convolutional layer.

In the example illustrated in FIG. 3, when the word-string vector sequence 11a is input to the input features 11, a pooling layer 13a is connected to the topic-dependent convolutional layer 12a and the topic-independent convolutional layer 12z. The pooling layer 13a performs a computational operation for extracting maximum values in the time direction from the outputs of the topic-dependent convolutional layer 12a and the topic-independent convolutional layer 12z. Also, when the word-string vector sequence 11b is input to the input features 11, a pooling layer 13b is connected to the topic-dependent convolutional layer 12b and the topic-independent convolutional layer 12z. The pooling layer 13b performs a computational operation for extracting maximum values in the time direction from the outputs of the topic-dependent convolutional layer 12b and the topic-independent convolutional layer 12z.

The fully connected layer 14 performs full connection processing on outputs of the pooling layer 13. More specifically, the fully connected layer 14 performs weighted addition on the outputs of the pooling layer 13, the weighted addition using a connection weight, and then converts the result of the addition into a probability distribution. In the present embodiment, the fully connected layer 14 multiplies the outputs of the pooling layer 13 for the respective output elements by a connection weight, adds up the resulting outputs, and lastly represents the results of the addition with probability distributions by using the softmax function.

In the example illustrated in FIG. 3, when the word-string vector sequence 11a is input to the input features 11, the pooling layer 13a and a fully connected layer 14a are connected to each other. The fully connected layer 14a multiplies outputs of the pooling layer 13a by a connection weight, adds up the resulting outputs, and lastly represents the result of the addition with a probability distribution by using the softmax function. Also, when the word-string vector sequence 11b is input to the input features 11, the pooling layer 13b and a fully connected layer 14b are connected to each other. The fully connected layer 14b multiplies outputs of the pooling layer 13b by a connection weight, adds up the resulting outputs, and lastly represents the result of the addition with a probability distribution by using the softmax function.

The fully connected layer 14 then compares the probability distributions in the outputs of the pooling layer 13 with a threshold to estimate a subject label of the dialog and outputs the estimated subject label.

As described above, by solving an input as a two-class classification problem, the convolutional neural network 10 estimates a dialog subject label for the input.

In other words, the output elements in the fully connected layer 84 in the comparative example described above and illustrated in FIG. 1 correspond to all subject labels, respectively, to solve (learn) a problem as a multi-class classification problem. On the other hand, the subject estimation system utilizing the convolutional neural network 10 in the present embodiment has topic-dependent convolutional layers that are specific to respective subjects (topics) and a topic-independent convolutional layer that is not specific to the topics, as described above. Accordingly, a problem with respect to the subject label "pricerange" can be solved (learned) as a two-class classification problem as to whether the subject label is pricerange or not pricerange (NOT pricerange), as illustrated in FIG. 3. Thus, even when there is an imbalance in the numbers of pieces of learning data for respective subjects, not only is a result of learning of a subject for which the number of pieces of learning data is small unaffected by a result of learning of a subject for which the number of pieces of learning data is large, but also the performance, that is, the estimation accuracy, on the small number of pieces of learning data improves.

(Learning of Convolutional Neural Network 10)

Now, a description will be given of learning of the convolutional neural network 10 in the present embodiment.

In the present embodiment, dialog text for learning (herein referred to as "learning dialog text") is used as learning data (training data). This learning dialog text is text that was transcribed from a dialog and in which time-series text of the dialog is pre-divided into segments for respective topics and labels for the corresponding topics are pre-given to the respective divided segments. For example, a data set in Dialog State Tracking Challenge 4 (DSTC4) may be used as the learning dialog text.

In the convolutional neural network 10, each of the one or more topic-dependent convolutional layers 12a and 12b is made to learn the first weights so as to perform a convolution operation dependent on each topic on which the topic-dependent convolutional layer is dependent, and the topic-independent convolutional layer 12z is made to learn the second weights so as to perform a convolution operation not dependent on the topic on which the topic-dependent convolutional layer is dependent. In response to an input of a word-string vector sequence that is included in word-string vector sequences corresponding to the learning dialog text and that is relevant to the topic on which the topic-dependent convolutional layer is dependent, each of the one or more topic-dependent convolutional layers learns the first weights so as to perform a convolution operation dependent on the topic. In response to an input of a word-string vector sequence corresponding to the learning dialog text, the topic-independent convolutional layer 12z learns the second weights so as to perform a convolution operation not dependent on the topic on which the topic-dependent convolutional layer is dependent.

Also, in the convolutional neural network 10, the convolution weights (the first weights and the second weights) in the convolutional layer 12 and the connection weight in the fully connected layer 14 are learned based on a difference (error) between a desirable output and an actual output. Stochastic gradient descent (SGD) and so on are known as learning algorithms for performing learning based on a difference (error) between a desirable output and an actual output. Since the learning algorithm may be a known algorithm, a description thereof is not given herein.

Such learning processing is performed on each of the topic-dependent convolutional layer 12a, the topic-dependent convolutional layer 12b, and the topic-independent convolutional layer 12z included in the convolutional layer 12. Thus, in each of the topic-dependent convolutional layers 12a and 12b, a connection is made to specific linguistic expressions depending on a topic, and the amount of dialog sentences for the topic on which each of the topic-dependent convolutional layer 12a and 12b is dependent, the dialog sentences being included in learning data, is limited. Thus, the amount of learning data becomes relatively small. On the other hand, in the topic-independent convolutional layer 12z, a connection is made to linguistic expressions not dependent on a topic, and thus the amount of learning data becomes relatively large.

Both (the topic-dependent convolutional layer 12a or 12b and the topic-independent convolutional layer 12z) are configured so as to connect to each other at the subsequent stages (the pooling layer 13 and the fully connected layer 14), as illustrated in FIG. 3. Thus, a balance is achieved through learning. That is, the connection weight for the topic-dependent convolutional layers 12a and 12b and the topic-independent convolutional layer 12z is adjusted for both a topic for which the amount of learning data is large and a topic for which the amount of learning data is small.

As a result, when a topic for which the amount of learning data is large is input as a dialog sentence, outputs of the topic-dependent convolutional layer are emphasized, and when a topic for which the amount of learning data is small is input as a dialog sentence, outputs of the topic-independent convolutional layer are emphasized. This reduces a performance difference due to a difference in the amounts of learning data. This configuration can raise the performance (the estimation accuracy) on a topic for which the amount of learning data is small.

In addition, since the topic-dependent convolutional layer 12a or 12b and the topic-independent convolutional layer 12z are configured so as to connect to each other at the higher tiers (the pooling layer 13 and the fully connected layer 14), as illustrated in FIG. 3, a problem as described above with reference to FIG. 2 does not occur. That is, the subject estimation system in the present embodiment including the convolutional neural network 10 can estimate a multi-domain dialog subject by using the convolutional neural network.

[Functional Configuration of Subject Estimation System in Present Embodiment]

Next, a specific description will be given of learning and discrimination in the subject estimation system in the present embodiment. The description below will be given using functional configuration diagrams and operation diagrams for learning and discrimination in the subject estimation system.

(During Discrimination)

Figure 4:
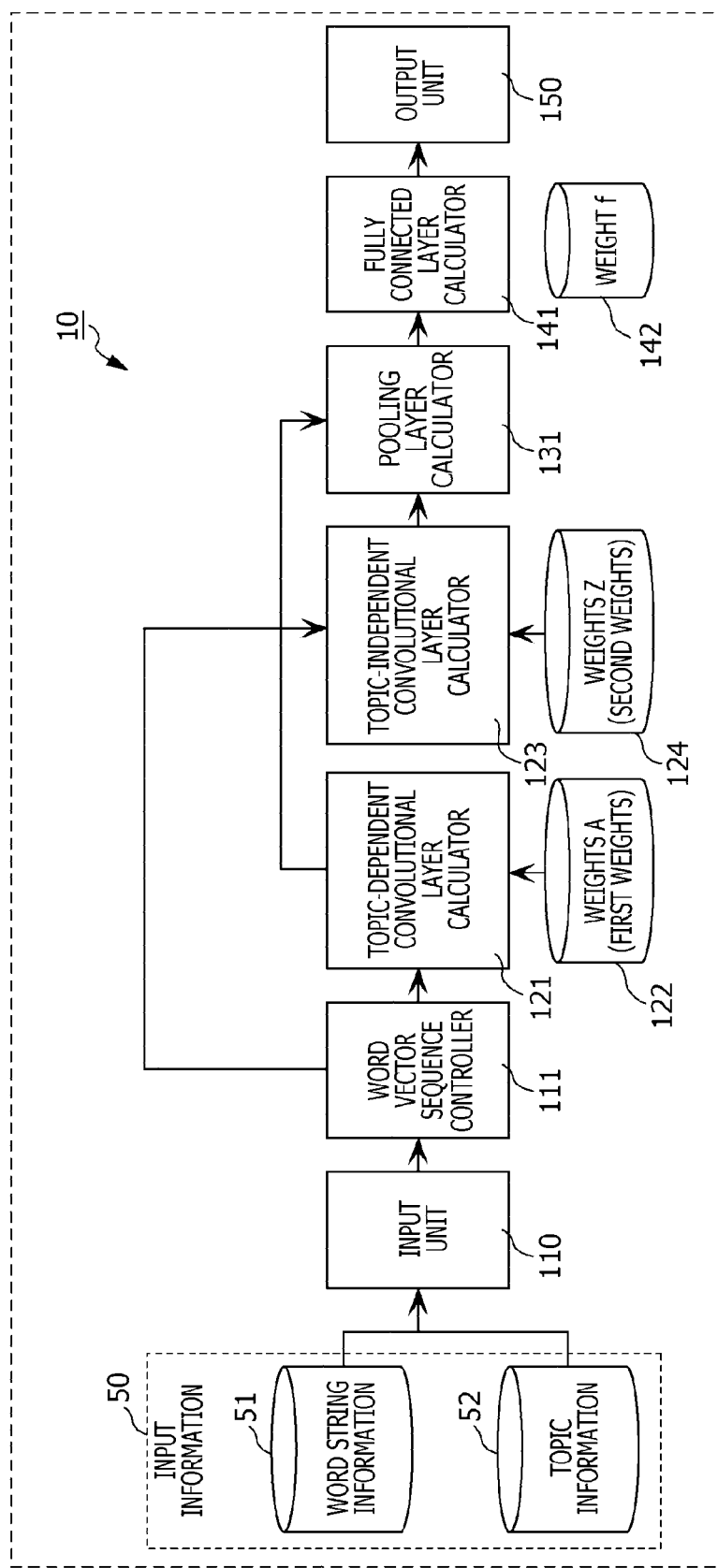
FIG. 4 is a block diagram illustrating a functional configuration during discrimination in the subject estimation system in the first embodiment.

FIG. 4 is a block diagram illustrating a functional configuration during discrimination in the subject estimation system in the present embodiment. In this case, the convolutional neural network 10 utilized by the subject estimation system is illustrated in a functional block diagram.

The subject estimation system in the present embodiment illustrated in FIG. 4 includes an input unit 110, a word vector sequence controller 111, a topic-dependent convolutional layer calculator 121, a topic-independent convolutional layer calculator 123, a pooling layer calculator 131, a fully connected layer calculator 141, and an output unit 150. This subject estimation system further includes a storage unit 122 in which weights A (the first weights) are stored, a storage unit 124 in which weights Z (the second weights) are stored, and a storage unit 142 in which a weight f is stored. The input unit 110 and the word vector sequence controller 111 have the functional configuration of the above-described input features 11. The topic-dependent convolutional layer calculator 121, the storage unit 122, the topic-independent convolutional layer calculator 123, and the storage unit 124 have the functional configuration of the above-described convolutional layer 12. The pooling layer calculator 131 has the functional configuration of the above-described pooling layer 13, and the fully connected layer calculator 141 and the storage unit 142 have the functional configuration of the above-described fully connected layer 14.

Input information 50 including word string information 51 and topic information 52 is input to the subject estimation system illustrated in FIG. 4. The input unit 110 receives a word string from the word string information 51 and simultaneously receives a topic from the topic information 52. The word vector sequence controller 111 converts the word string into a vector sequence by using a predetermined method. For converting a word string into vectors, various methods, such as a method called bag-of-words and a method using compressed dimensions thereof, have been proposed, and any of those known methods may be used as the aforementioned predetermined method.

The topic-dependent convolutional layer calculator 121 performs a convolution operation by using a word-string vector sequence and the weights A (the first weights). The number of weights A (the first weights) is equal to the total number of filters for the respective topics. The topic-independent convolutional layer calculator 123 performs a convolution operation by using a word-string vector sequence and the weights Z (the second weights). The number of weights Z (the second weight) is equal to the number of topic-independent filters.

The pooling layer calculator 131 extracts maximum values, viewed in the direction direction, of outputs of the topic-dependent convolutional layer calculator 121 and the topic-independent convolutional layer calculator 123, the outputs corresponding to the respective filters.

The fully connected layer calculator 141 multiplies outputs corresponding to the filters for respective output elements by the weight f, adds up the resulting outputs, and lastly represents the results of the addition with probability distributions by using the softmax function. For example, when the subjects of outputs are "pricerange" and "NOT pricerange", as in the example illustrated in FIG. 3, the outputs of two elements are adjusted by the softmax function so that they are each 0 or more and the sum thereof is 1.

The output unit 150 compares the result of the fully connected layer calculator 141 with a threshold (e.g., 0.5) and outputs a subject with which the probability distribution exceeds the threshold.

Figure 5:
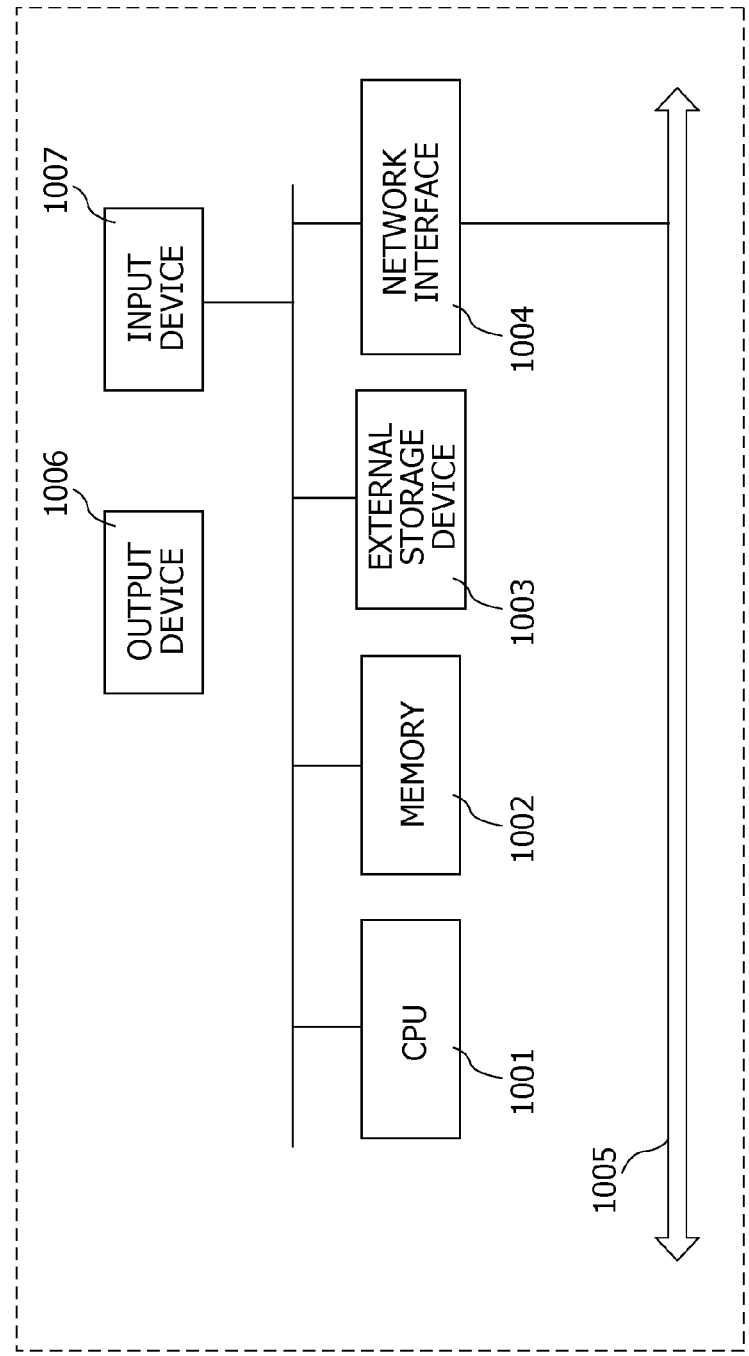
FIG. 5 is a diagram illustrating one example of the hardware configuration of a computer needed to implement the subject estimation system.

This subject estimation system is implemented by a computer having a hardware configuration as illustrated in FIG. 5. FIG. 5 is a diagram illustrating one example of the hardware configuration of a computer needed to implement the subject estimation system.

As illustrated in FIG. 5, the computer that implements the subject estimation system includes a central processing unit (CPU) 1001, a memory 1002, an external storage device 1003, a network interface 1004, an output device 1006, and an input device 1007. These elements are connected through a bus.

All computational operations in this subject estimation system are performed by the CPU 1001, and values (such as the weights) that need to be updated and programs are stored in the memory 1002. A large amount of data, such as learning data, is stored in the external storage device 1003. The network interface 1004 is used to access data on the Internet 1005 to externally receive learning data. The output device 1006 and the input device 1007 are also required as user interfaces. The input device 1007 serves as a user interface, including input buttons, a touch pad, or a touch panel display, and receives a user' operation.

Figure 6:
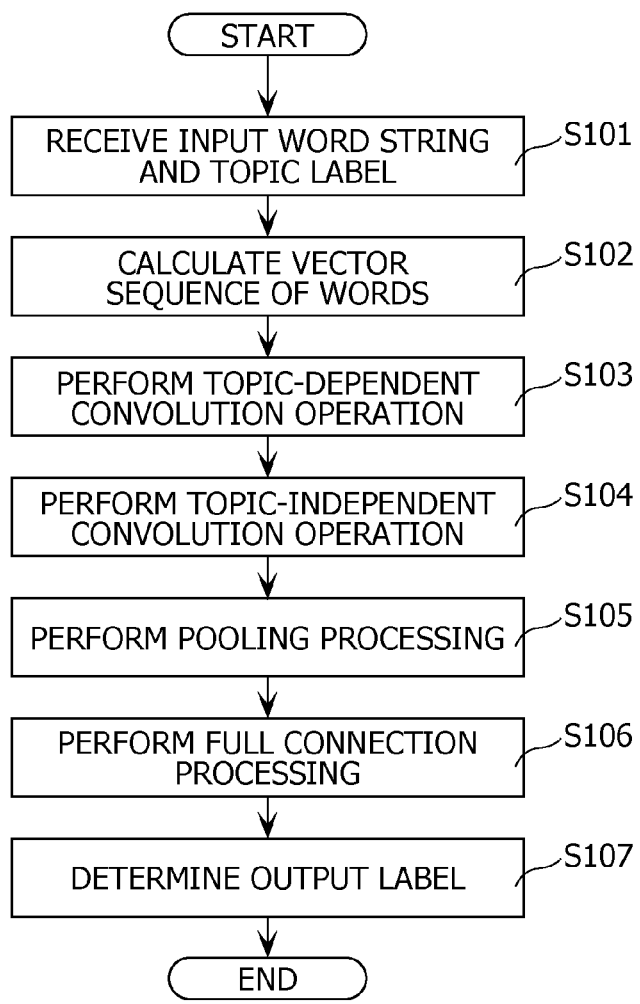
FIG. 6 is a flowchart illustrating operations in the subject estimation system during discrimination illustrated in FIG. 4.

FIG. 6 is a flowchart illustrating operations in the subject estimation system during discrimination illustrated in FIG. 4.

First, the input unit 110 receives an input word string and a topic label (S101). Next, the word vector sequence controller 111 performs calculation on individual words of the input word string to obtain a vector sequence of the words (a word string) by using a predetermined method (S102). Next, the topic-dependent convolutional layer calculator 121 performs a convolution operation (a topic-dependent convolution operation) between the vector sequence of the words and the weights A (the first weights) stored in the storage unit 122 (S103). Next, the topic-independent convolutional layer calculator 123 performs a convolution operation (a topic-independent convolution operation) between the vector sequence of the words and the weights Z (the second weights) stored in the storage unit 124 (S104). Next, the pooling layer calculator 131 performs pooling processing for extracting maximum values of the respective filters from outputs of the topic-dependent convolutional layer calculator 121 and outputs of the topic-independent convolutional layer calculator 123 (S105). Next, the fully connected layer calculator 141 performs full connection processing on outputs of the pooling layer calculator 131 (S106). More specifically, the fully connected layer calculator 141 assigns the weight f stored in the storage unit 122 to the outputs of the pooling layer calculator 131 and adds up the resulting outputs. After performing the weighted addition to all output labels, the fully connected layer calculator 141 represents the results thereof with probability distributions. Lastly, by comparing the probability distributions for the output labels with a threshold, the output unit 150 determines an output label (S107).

When the subject estimation system illustrated in FIG. 4 performs multi-label output, it may perform the process in S103 and the process in S104 in parallel and integrate the results of the processes together at the subsequent stages. The same also applies to the processing during learning described below.

(During Learning)

Figure 7:
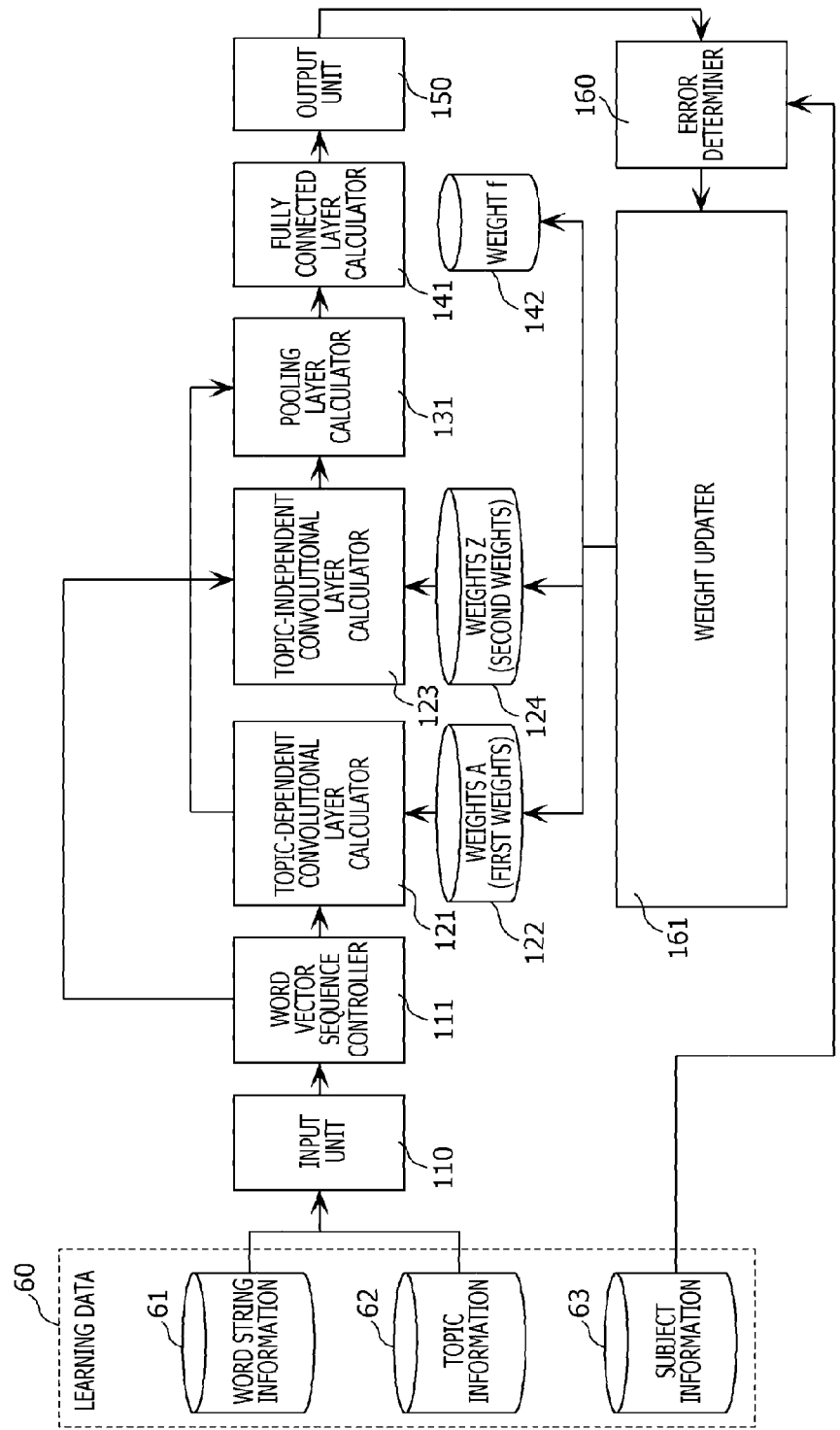
FIG. 7 is a block diagram illustrating a functional configuration during learning in the subject estimation system in the first embodiment.

FIG. 7 is a block diagram illustrating a functional configuration for learning in the subject estimation system in the present embodiment. Elements that are the same as or similar to those in FIG. 4 are denoted by the same reference numerals, and detailed descriptions thereof are not given. The subject estimation system during learning illustrated in FIG. 7 is implemented by a computer having a hardware configuration as described above and illustrated in FIG. 5, as in the subject estimation system during discrimination illustrated in FIG. 4.

Compared with the functional configuration diagram during discrimination illustrated in FIG. 4, the functional configuration diagram during learning illustrated in FIG. 7 differs in learning data 60, an error determiner 160, and a weight updater 161.

Word string information 61 and topic information 62 are input to the subject estimation system during learning as learning data (training data). The learning data 60 includes subject information 63 that corresponds to the word string information 51 and the topic information 52 input to the subject estimation system during learning and that is desirable as outputs.

The error determiner 160 compares the probability distribution for the subject label output from the output unit 150 with a probability distribution when the probability of a desirable subject label obtained from the subject information 63 is set to 1.0 and the probability of other labels is set to 0.0 and outputs the difference between the probability distributions as an error.

In accordance with a predetermined learning algorithm, the weight updater 161 determines the respective amounts of update of the weights A (the first weights), the weights Z (the second weights), and the weight f, on the basis of the value of the error output from the error determiner 160, and then executes the update of the weights A, Z, and f. Such weight update is repeatedly executed on the entire learning data, while varying a learning coefficient.

Figure 8:
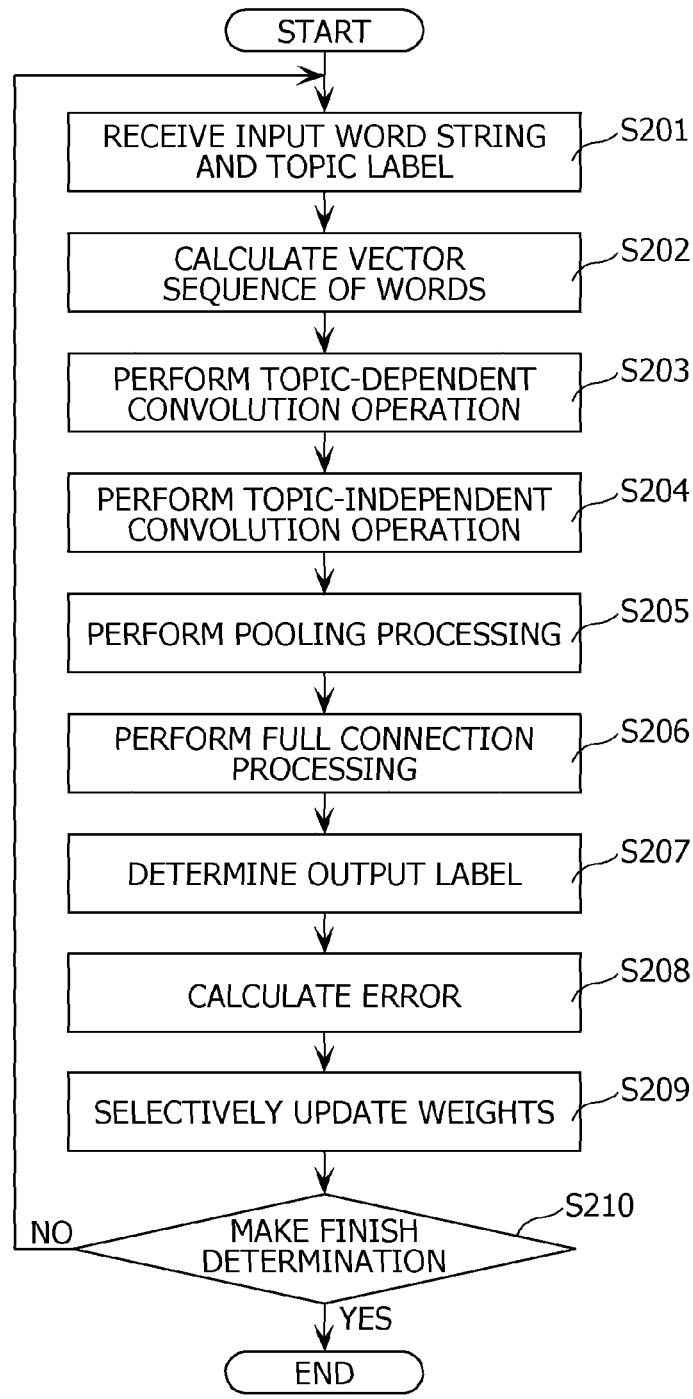
FIG. 8 is a flowchart illustrating operations in the subject estimation system during learning illustrated in FIG. 7.

FIG. 8 is a flowchart illustrating operations in the subject estimation system during learning illustrated in FIG. 7. Since the processing in S201 to S207 is analogous to the processing in S101 to S107 illustrated in FIG. 6, a description thereof is not given hereinafter.

In the processing up to S207, the subject estimation system during learning estimates a probability distribution for a subject label on the basis of the input word string and the topic. Next, the error determiner 160 obtains a desirable subject from the subject information 63, sets a desirable value (probability) of the probability distribution for the subject label, and calculates a difference between the set value and the estimated probability distribution for the subject label as an error (S208). Next, in accordance with a predetermined learning algorithm, the weight updater 161 updates the weights A (the first weights) used by the topic-dependent convolutional layer calculator 121, the weights Z (the first weights) used by the topic-independent convolutional layer calculator 123, and the weight f that is relevant to the current topic and that is used by the fully connected layer calculator 141 (S209).

A finish determination is made as to whether or not the learning satisfies a preset finish condition (S210), and the learning is repeated until the finish condition is satisfied. The finish condition in the finish determination may be a condition that no error is addressed even when the update of the weights is performed or a condition that the amount of error reaches a threshold or smaller.

[Advantages, Etc.]

As described above, the subject estimation system utilizing the convolutional neural network 10 in the present embodiment can more accurately estimate the subject of a dialog even when the amount of learning data is not sufficient. The subject estimation system can also estimate a multi-domain dialog subject.

More specifically, the convolutional layer 12 in the convolutional neural network 10 is constituted by the topic-dependent convolutional layers dependent on topics and the topic-independent convolutional layer not dependent on the topics, outputs thereof are merged in the pooling layer, and the outputs from the topic-dependent convolutional layers and the outputs from the topic-independent convolutional layer are balanced in the fully connected layer. As a result, when a topic for which the amount of learning data is large is input as a dialog sentence, outputs of the topic-dependent convolutional layer are emphasized, and when a topic for which the amount of learning data is small is input as a dialog sentence, outputs of the topic-independent convolutional layer are emphasized. This reduces a performance difference due to a difference in the amounts of learning data.

Now, the fact that the subject estimation system utilizing the convolutional neural network 10 in the present embodiment has an improved estimation accuracy over the subject estimation system utilizing the neural network in the comparative example will be described using a result of experimental verification.

FIG. 9 is a table illustrating a result of experimental verification of the subject estimation system in the present embodiment. The result illustrated in FIG. 9 is a result of comparison of the accuracy of subject estimation performed by the subject estimation system in the comparative example between the accuracy of subject estimation performed by the subject estimation system in the present embodiment when a dialog corpus in Dialog State Tracking Challenge 4 (DSTC4) is used. The DSTC4 dialog corpus includes dialogs in five domains (attraction, accommodation, food, shopping, and transportation). Although, in each domain, a total of 54 types of subject, including pricerange, preference, exhibit, and so on, can be estimated for dialog sections, FIG. 9 illustrates a result when the dialog subject label is "pricerange". Also, (42/30) in "Accommodation (42/30)" illustrated in FIG. 9 means that the number of pieces of learning data is 42 and the number of pieces of test data is 30.

The general model in the comparative example is, for instance, a subject estimation system that utilizes the convolutional neural network 80 illustrated in FIG. 1 and that was made to learn all topics by using the single convolutional neural network 80. Also, the topic-specific model in the comparative example means a case in which a subject estimation system is configured for each domain, such as a subject estimation system utilizing the neural network that learns only dialogs in the domain of attraction. That is, the topic-specific model in the comparative example means a case in which a neural network in an independent subject estimation system is made to perform learning for each topic.

In addition, the multi-topic model means the subject estimation system in the present embodiment, the subject estimation system utilizing the convolutional neural network 10 illustrated in FIG. 3.

As illustrated in FIG. 9, according to the experimental result, the multi-topic model has higher rates of correct solutions in all of the domains in the case in which the dialog subject label is "pricerange" than those in the comparative examples. The experimental result also shows that, with respect to an F value (overall) indicating the estimation accuracy, the multi-topic model is also improved over the two comparative examples.

The estimation accuracy for all dialog subject labels by using the DSTC4 dialog corpus was 48% for the multi-topic model, the estimation accuracy was 43% for the general model, and the estimation accuracy was 43% for the topic-specific model, and and this also shows that the estimation accuracy for the multi-topic model is improved over the two comparative examples.

Second Embodiment

In the first embodiment, the description has been given of the fact that the estimation accuracy of subject estimation is improved by configuring the convolutional layer 12 by using the topic-dependent convolutional layers, which depend on topics, and the topic-independent convolutional layer, which does not depend on the topics. With the configuration of the convolutional layer 12, the amount of learning data for the topic-dependent convolutional layers tends to decrease, as described above. In a second embodiment, a case in which the subject estimation system utilizing the convolutional neural network 10 described above in the first embodiment utilizes semi-supervised learning in order to compensate for a deficiency in the amount of learning data will be described with reference to a functional configuration diagram and an operation diagram.

Figure 10:
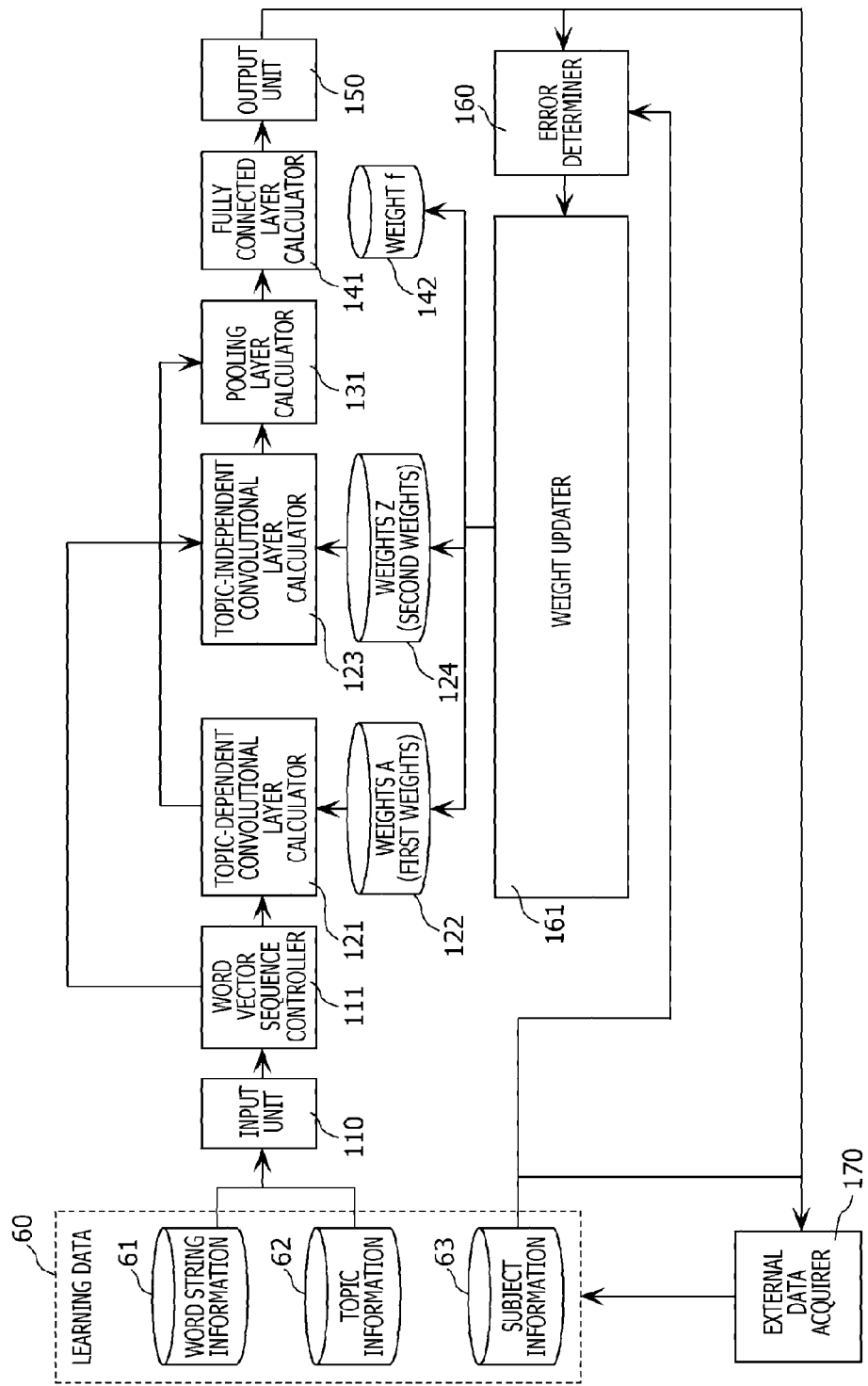
FIG. 10 is a block diagram illustrating a functional configuration during additional learning in the subject estimation system in a second embodiment.

FIG. 10 is a block diagram illustrating a functional configuration during additional learning in the subject estimation system in the present embodiment. Elements that are the same as or similar to those in FIG. 7 are denoted by the same reference numerals, and descriptions thereof are not given hereinafter. The subject estimation system during additional learning illustrated in FIG. 10 is implemented by a computer having a hardware configuration as described above and illustrated in FIG. 5, as in the subject estimation system during learning illustrated in FIG. 7.

In the functional configuration diagram during additional learning illustrated in FIG. 10, an external data acquirer 170 is further added to the functional configuration diagram during learning illustrated in FIG. 7.

When the number of word-string vector sequences that are included in word-string vector sequences corresponding to learning dialog text and that are relevant to a certain topic on which the topic-dependent convolutional layer is dependent is smaller than the number of word-string vector sequences that are included in the word-string vector sequences corresponding to the learning dialog text and that are relevant to another topic on which the topic-dependent convolutional layer is dependent, the external data acquirer 170 acquires, as semi-supervised data of the learning data, dialog text that is relevant to the certain topic and that is obtained through web searching.

More specifically, for example, when the content of dialog data is related to travel planning, the external data acquirer 170 acquires text information related to travelling from a travel word-of-mouth website on the Internet as unsupervised learning data. However, correct solution labels for subject information have not been given to information in word-of-mouth travel websites, unlike the case of the above-described learning data (supervised learning data) using a known data set. Topic labels have not been given to the information in the word-of-mouth travel websites, either.

Accordingly, the subject estimation system in the present embodiment gives correct solution labels to such information (which is unsupervised learning data) in the word-of-mouth travel website in a pseudo manner, to thereby increase the supervised learning data. This makes it possible to increase the supervised learning data for a topic for which the amount of learning data is small. More specifically, the subject estimation system illustrated in FIG. 10 estimates a subject by performing operations during discrimination (i.e., by performing discrimination processing in S101 to S107 illustrated in FIG. 6). All labels for topics of the information in the word-of-mouth travel website are sequentially input to the subject estimation system illustrated in FIG. 10. In addition, a topic label and a subject label are given by limiting to those for which the thus-obtained subject estimation probability of an output of the fully connected layer calculator 141, the probability corresponding each topic, is larger than a preset threshold.

Next, the subject estimation system illustrated in FIG. 10 performs the operations during learning (i.e., performs the learning processing in S201 to S210 illustrated in FIG. 8) again by using the information in the word-of-mouth travel website, the topic labels and the subject labels being given to the information, thereby repeating the discrimination processing on the information in the word-of-mouth travel website and the learning processing. In the learning processing (semi-supervised learning processing) repeated in such a manner, the threshold may be set high initially and be reduced gradually. During acquisition of text data from a word-of-mouth website, for example, when the title is "exhibition", it can be expected that the content thereof is relevant to a subject label "exhibit". Thus, it is effective when relevant words and phrases are set for each subject label, and a restriction is applied by using a title or the like. It is effective when a restriction is also applied to each topic label by using a title or the like. That is, the external data acquirer 170 can acquire supervised learning data corresponding to a predetermined useful dialog subject, by acquiring external unsupervised data, such as review sentences in a word-of-mouth travel website, and excluding, from the acquired unsupervised learning data, data irrelevant to the dialog subject by using a keyword.

Figure 11:
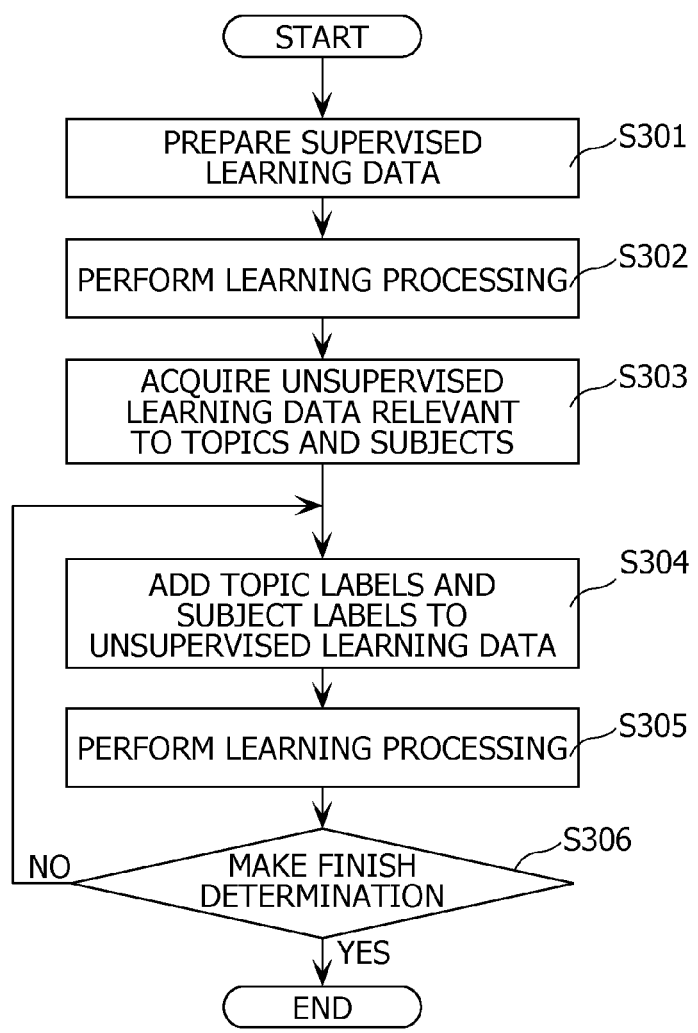
FIG. 11 is a flowchart illustrating operations in the subject estimation system during additional learning illustrated in FIG. 10.

FIG. 11 is a flowchart illustrating operations in the subject estimation system during additional learning illustrated in FIG. 10.

First, supervised learning data is prepared (S301). This supervised learning data is obtained by, for example, recording data of a dialog between humans and manually transcribing the dialog data. Alternatively, the supervised learning data is obtained by chatting through keyboard input and storing text thereof. In addition, annotation for specifying what is a topic from where to where in a dialog is manually performed. Crowdsourcing can be used for the annotation. However, since such work requires cost and is thus, in many cases, not sufficient to learn data for learning.

Next, the subject estimation system in the present embodiment performs the learning processing in S201 to S210, by using the obtained supervised learning data (S302).

Next, the external data acquirer 170 acquires unsupervised learning data relevant to topics and subjects (S303). Specifically, as described above, rather than acquiring data through refinement using a granularity, such as merely a word-of-mouth travel website, the external data acquirer 170 acquires, as unsupervised learning data (word strings), data obtained through finer refinement by utilizing titles and other headings through use of vocabulary relevant to labels for topics and subjects.

Next, the subject estimation system in the present embodiment estimates topic labels and subject labels of the unsupervised learning data by using the convolutional neural network 10 that performed the learning in the learning process in S302 and adds the estimated topic labels and subject labels to the unsupervised learning data (S304).

Next, by using the unsupervised learning data to which the topic labels and the subject labels are added, the subject estimation system in the present embodiment performs the learning processing in S201 to S210 again (S305). Since the weights (the first and second weights) in the convolutional neural network 10 vary between the result of the learning in S302 and the result of the learning in S305, the topic labels and the subject labels estimated in S304 also vary correspondingly.

Next, the subject estimation system in the present embodiment makes a finish determination based on the amount of change in update of the weights and so on (S306). If a finish condition is not satisfied, S304 and S305 are repeated.

[Advantages, Etc.]

As described above, even when the amount of learning data is not sufficient, the subject estimation system utilizing the convolutional neural network 10 in the present embodiment can increase the amount of supervised learning data to a sufficient level by performing discrimination processing on unsupervised learning data, giving correct solution labels thereto in a pseudo manner, and repeating learning processing. By doing so, the subject estimation system in the present embodiment can more accurately estimate a subject of a dialog.

Now, the fact that the estimation accuracy improves when the subject estimation system utilizing the convolutional neural network 10 in the present embodiment repeats learning processing as described above will be described using a result of experimental verification.

Figure 12:
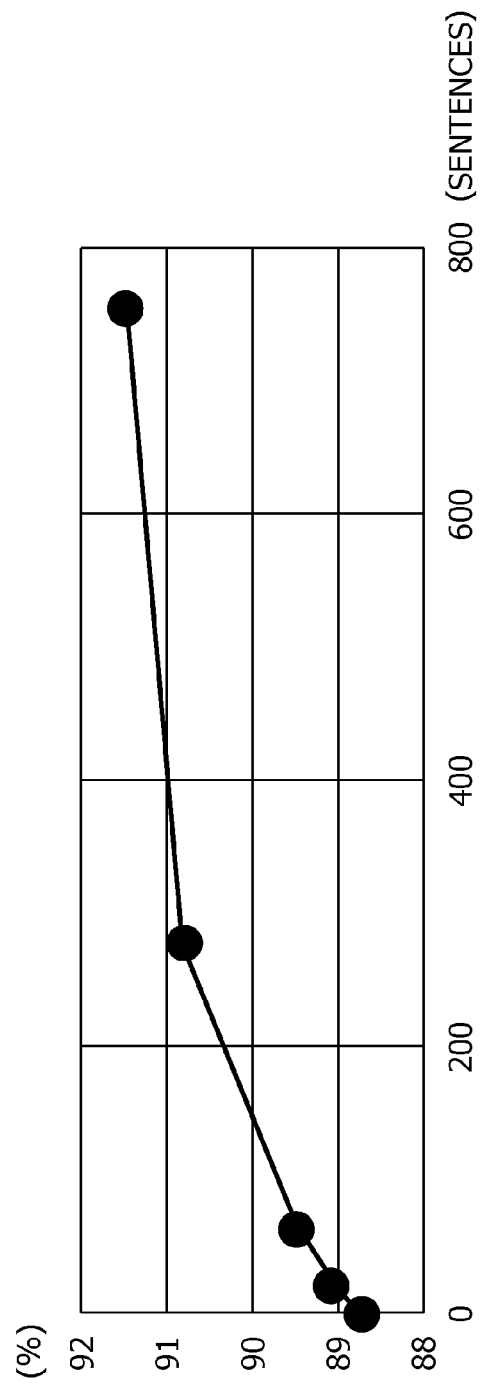
FIG. 12 is a graph depicting a result of experimental verification of the subject estimation system in the second embodiment.

FIG. 12 is a graph depicting a result of experimental verification of the subject estimation system in the present embodiment. FIG. 12 illustrates an advantage of semi-supervised learning processing performed by the subject estimation system in the present embodiment when a dialog corpus in DSTC4 is used.

In this experiment, in two-class classification as to whether or not a dialog sentence belongs to a subject "exhibit", unsupervised data externally acquired by semi-supervised learning processing performed by the subject estimation system in the present embodiment was added to original supervised data as teacher data (supervised data). In this case, the number of pieces of the original supervised learning data was 762, and the number of pieces of the added unsupervised learning data was 20 to 753.

As illustrated in FIG. 12, it can be seen that, when the externally acquired unsupervised data was subjected to the semi-supervised learning processing, and the resulting data was added as supervised learning data, the binary classification accuracy improved by up to 3%.

Although the subject estimation system and the subject estimation method according to the present disclosure have been described above in the first and second embodiments, the main bodies and devices in which the individual processes are executed are not particularly limiting. The processes may also be executed by a processor or the like (described below) incorporated into a particular device that is locally provided. Also, the processes may be executed by a cloud server or the like provided at a place different from that of a local device.

The present disclosure further encompasses cases as described below.

(1) The aforementioned device is, specifically, a computer system including a microprocessor, a read-only memory (ROM), a random-access memory (RAM), a hard disk unit, a display unit, a keyboard, a mouse, and so on. A computer program is stored in the RAM or the hard disk unit. The microprocessor operates in accordance with the computer program, so that each device realizes its functions. The computer program in this case is made of a combination of a plurality of instruction codes for giving instructions to a computer in order to achieve a predetermined function.

(2) Some or all of the constituent elements included in each device described above may be implemented by one system large scale integration (LSI). The system LSI is a super-multifunctional LSI circuit manufactured by integrating a plurality of constituent elements on one chip and is, specifically, a computer system including a microprocessor, a ROM, a RAM, and so on. The computer program is stored in the RAM. The microprocessor operates in accordance with the computer program, so that the system LSI realizes its functions.

(3) Some or all of the constituent elements included in the above-described device may be implemented by an integrated circuit (IC) card or a single module that can be inserted into and removed from the device. The IC card or the module may be a computer system including a microprocessor, a ROM, a RAM, and so on. The IC card or the module may include the aforementioned super-multifunctional LSI. The microprocessor operates in accordance with the computer program, so that the IC card or the module realizes its functions. The IC card or the module may be tamper-proof.

(4) The present disclosure may also be implemented by the methods described above. Those methods may also be realized by a computer program implemented by a computer or may be realized using digital signals provided by the computer program.

(5) In the present disclosure, the computer program or the digital signals may be recorded on computer-readable storage media, for example, a flexible disk, a hard disk, a CD-ROM, a magneto-optical (MO) disk, a digital versatile disk (DVD), a DVD-ROM, a DVD-RAM, a Blu-ray® Disc (BD), and a semiconductor memory. The present disclosure may also be realized by the digital signals recorded on the storage media.

Additionally, in the present disclosure, the computer program or the digital signals may be transmitted over a telecommunication channel, a wireless or wired communication channel, a network typified by the Internet, data broadcasting, or the like.

Moreover, the present disclosure may be realized by a computer system including a microprocessor and a memory, the memory may store the computer program, and the microprocessor may operate in accordance with the computer program.

The present disclosure may also be implemented by another independent computer system by transporting the storage medium on which the program or the digital signals are recorded or transferring the program or the digital signals over the network or the like.

The present disclosure is applicable to a subject estimation system and a subject estimation method that performs a task for estimating what is the subject of a dialog, which is a communication of a natural language basically between two parties, regardless of whether they are humans or machines.

What is claimed is:

1. A computer automated subject estimation system comprising:
    a processor; and
    a memory having a computer program stored thereon, the computer program causing the processor to execute a convolution neural network,
    wherein the convolution neural network includes:
    a convolutional layer including one or more topic-dependent convolutional layers and one topic-independent convolutional layer, each of the one or more topic-dependent convolutional layers performing, on an input of a word-string vector sequence corresponding to dialog text transcribed from a dialog, a convolution operation dependent on a topic, and the topic-independent convolutional layer performing, on the input of the word-string vector sequence, a convolution operation not dependent on the topic,
    a pooling layer performing a pooling process on outputs of the convolutional layer, and
    a fully connected layer performing a full connection process on outputs of the pooling layer and estimating a subject label of the dialog.

2. The computer automated subject estimation system according to claim 1,
    wherein the convolutional neural network estimates the subject label of the dialog with respect to the input by solving the input as a two-class classification problem.

3. The computer automated subject estimation system according to claim 1,
    wherein in the convolutional neural network, by using, as learning data, learning dialog text that is transcribed from a dialog and in which time-series text of the dialog is pre-divided into segments for respective topics and labels for the corresponding topics are pre-given to the respective divided segments, each of the one or more topic-dependent convolutional layers is made to learn first weights so as to perform a corresponding convolution operation dependent on each topic on which the topic-dependent convolutional layer is dependent, and the topic-independent convolutional layer is made to learn second weights so as to perform a convolution operation not dependent on the topic on which the topic-dependent convolutional layer is dependent.

4. The computer automated subject estimation system according to claim 3,
    wherein, in response to an input of a word-string vector sequence that is included in word-string vector sequences corresponding to the learning dialog text and that is relevant to the topic on which the topic-dependent convolutional layer is dependent, each of the one or more topic-dependent convolutional layers is made to learn the first weights so as to perform a convolution operation dependent on the topic on which the topic-dependent convolutional layer is dependent; and
    wherein, in response to an input of the word-string vector sequence corresponding to the learning dialog text, the topic-independent convolutional layer is made to learn the second weights so as to perform a convolution operation not dependent on the topic on which the topic-dependent convolutional layer is dependent.

5. A computer automated subject estimation method in a convolution neural network comprising:
    performing, on an input of a word-string vector sequence corresponding to dialog text transcribed from a dialog, topic-dependent convolution process including a convolution operation dependent on a topic by using a processor;
    performing, on the input, topic-independent convolution process including a convolution operation not dependent on the topic by using the processor;
    performing pooling process on outputs of (i) the topic-dependent convolution process and (ii) the topic-independent convolution process by using processor; and
    performing full connection process on outputs of the pooling process and estimating a subject label of the dialog by using the processor.

6. The computer automated subject estimation method according to claim 5,
    wherein, in the performing of the topic-dependent convolution process, a convolution operation between the word-string vector sequence and first weights triggered by a specific word indicating a topic on which the topic-dependent convolution process is dependent is performed;

wherein, in the performing of the topic-independent convolution process, a convolution operation between the word-string vector sequence and second weights triggered by a word indicating a topic other than the topic on which the topic-dependent convolution process is dependent is performed;

wherein, in the performing of the pooling process, a computational operation for extracting maximum values in a time direction from the outputs of the topic-dependent convolution process and the outputs of the topic-independent convolution process is performed; and wherein, in the performing of the full connection process, after weighted addition using a connection weight is performed on the outputs of the pooling process, a result of the weighted addition is represented with a probability distribution to perform the full connection process.

7. The computer automated subject estimation method according to claim 6, further comprising:

estimating a subject label of the dialog by comparing the probability distribution of the outputs of the pooling process with a threshold, and outputting the subject label.

8. The computer automated subject estimation method according to claim 5, further comprising:

inputting the word-string vector sequence corresponding to the dialog text, wherein the dialog text is text transcribed from a dialog in a time series, and the word-string vector sequence is obtained by calculating vectors of words in a word string included in the dialog text by using a predetermined method.

9. The computer automated subject estimation method according to claim 6, further comprising:

making the convolutional neural network learn the first weights so as to perform a convolution operation dependent on a topic on which the topic-dependent convolution process is dependent, by using, as learning data, learning dialog text that is transcribed from a dialog and in which time-series text of the dialog is pre-divided into segments for respective topics and labels for the corresponding topics are pre-given to the respective divided segments; and making the convolutional neural network learn the second weights so as to perform, in the topic-independent convolution process, a convolution operation not dependent on the topic on which the topic-dependent convolution process is dependent, by using the learning dialog text.

10. The computer automated subject estimation method according to claim 9, wherein in the learning of the first weights, the convolutional neural network is made to learn the first weights by using a word-string vector sequence that is included in word-string vector sequences corresponding to the learning dialog text and that is relevant to the topic on which the topic-dependent convolution process is dependent; and wherein in the learning of the second weights, the convolutional neural network is made to learn the second weights by using a word-string vector sequence that is included in the word-string vector sequences corresponding to the learning dialog text and that is relevant to a topic other than the topic on which the topic-dependent convolution process is dependent.

11. The computer automated subject estimation method according to claim 10, wherein, when the number of word-string vector sequences that are included in the word-string vector sequences corresponding to the learning dialog text and that are relevant to a first topic on which the convolution operation is dependent is smaller than the number of word-string vector sequences that are included in the word-string vector sequences corresponding to the dialog text and that are relevant to a second topic on which the convolution operation is dependent, dialog text that is relevant to the first topic and is obtained through web searching is used as semi-supervised data of the learning data to perform the learning of the first weights and the learning of the second weights.

12. A non-transitory recording medium having a computer program stored thereon, the computer program causing a processor to execute a convolution network for computer automated subject estimation, the convolution network comprising:

performing, on an input of a word-string vector sequence corresponding to dialog text transcribed from a dialog, a topic-dependent convolution process including a convolution operation dependent on a topic;

performing, on the input, a topic-independent convolution process including a convolution operation not dependent on the topic;

performing a process on outputs of (i) the topic-dependent convolution process and (ii) the topic-independent convolution process; and performing a full connection process on outputs of the pooling process and estimating a subject label of the dialog.

\* \* \* \* \*